(12) United States Patent
Takahashi

(10) Patent No.: US 10,756,611 B2
(45) Date of Patent: Aug. 25, 2020

(54) MOLTEN METAL TRANSFER PUMP AND MOLTEN METAL TRANSFER SYSTEM

(71) Applicant: Kenzo Takahashi, Matsudo (JP)

(72) Inventor: Kenzo Takahashi, Matsudo (JP)

( * ) Notice: Subject to any disclaimer, the term of this patent is extended or adjusted under 35 U.S.C. 154(b) by 206 days.

(21) Appl. No.: 15/773,740

(22) PCT Filed: Jun. 9, 2016

(86) PCT No.: PCT/JP2016/067257
§ 371 (c)(1),
(2) Date: May 4, 2018

(87) PCT Pub. No.: WO2017/077731
PCT Pub. Date: May 11, 2017

(65) Prior Publication Data
US 2018/0323693 A1    Nov. 8, 2018

(30) Foreign Application Priority Data

Nov. 5, 2015 (JP) .................. 2015-217805

(51) Int. Cl.
  *H02K 44/06* (2006.01)
  *B22D 35/00* (2006.01)
(52) U.S. Cl.
  CPC ............. *H02K 44/06* (2013.01); *B22D 35/00* (2013.01)
(58) Field of Classification Search
  CPC .............................. B22D 35/00; H02K 44/06
  USPC ............ 266/234, 236, 237; 417/50; 222/594
  See application file for complete search history.

(56) References Cited

U.S. PATENT DOCUMENTS

| 3,251,302 A * | 5/1966 | Baker ................... H02K 44/06 417/50 |
| 3,759,635 A * | 9/1973 | Carter .................. H02K 44/06 417/50 |
| 4,906,877 A | 3/1990 | Ciaio |
| 7,316,800 B1 * | 1/2008 | Dardik ................ B22D 39/003 266/237 |

FOREIGN PATENT DOCUMENTS

| JP | 1-222649 A | 9/1989 |
| JP | 2-46159 A | 2/1990 |
| JP | 2007-21539 A | 2/2007 |

OTHER PUBLICATIONS

International Search Report dated Jul. 5, 2016 in PCT/JP2016/067257, filed on Jun. 9, 2016.

* cited by examiner

Primary Examiner — Scott R Kastler
Assistant Examiner — Michael Aboagye
(74) Attorney, Agent, or Firm — Oblon, McClelland, Maier & Neustadt, L.L.P.

(57) ABSTRACT

A molten metal transfer pump in which a spiral flow channel is formed by a cylindrical body and a spiral body received in the cylindrical body while being fixed and which allows molten metal to swirl in the spiral flow channel by using Lorentz force generated by a current that flows in a longitudinal direction in molten metal in the cylindrical body and a lateral magnetic field that is generated by a permanent magnet provided on the outer periphery of the cylindrical body.

14 Claims, 8 Drawing Sheets

MOLTEN METAL TRANSFER PUMP AND MOLTEN METAL TRANSFER SYSTEM

BACKGROUND OF THE INVENTION

Field of the Invention

The present invention relates to a transfer pump that transfers molten conductive metal and a molten metal transfer system using the molten metal transfer pump.

Background Art

A mechanical pump, an electromagnetic pump, a vacuum pump, and the like have been present in the past as a transfer pump for molten conductive metal, such as copper or aluminum. These pumps have the following drawbacks, and these drawbacks are not yet solved.

That is, the mechanical pump is a model that is most widely used, but rotating blades should be appropriately replaced since damage to the rotating blades is severe. However, much time is required to replace the rotating blades. Naturally, an operation should be stopped for a long time in the replacement of the rotating blades. For this reason, loss caused by the stop of the operation is very large. Further, since the rotating blade itself is expensive, not only the initial costs of the rotating blade but also the running costs of the rotating blade caused by replacement are also very high.

Since a system for cooling a coil is complicated and a coil having a volume corresponding to a necessary magnetic force is required to obtain a necessary magnetic force, an increase in the size of the electromagnetic pump cannot be avoided. Furthermore, there are also drawbacks that running costs are increased due to large power consumption, the operation management of the electromagnetic pump, such as a detailed clogging-preventing countermeasure for molten metal, is very complicated, and the like.

Since the vacuum pump has many troubles that molten metal is sucked into a vacuum pump chamber during the operation, it is difficult to manage the operation of the vacuum pump.

That is, these conventional pumps have drawbacks that complicated maintenance is required, a lot of running costs are required, and it is difficult to manage the operations of the pumps.

SUMMARY OF THE INVENTION

Technical Problem

In consideration of these drawbacks, many users desire that a molten metal transfer pump of which running costs are low due to a simple structure and easy operation management appears.

Solution to Problem

A pump according to the present invention is
a molten metal transfer pump that sucks and discharges molten conductive metal, the pump including:
a cylindrical body that is formed of a cylindrical side wall and includes a lower opening as a suction port provided at a lower end and an upper opening provided at an upper end;
a spiral body that is received in the cylindrical body while being fixed; and
a magnetic field device that is provided on an outer periphery of the cylindrical body,
in which the cylindrical body includes a side-wall opening that is opened on the side wall and serves as a discharge opening,
the spiral body includes a spiral plate, an inner space of the cylindrical body is partitioned into one spiral flow channel, which extends in a spiral shape, by an outer peripheral edge of the spiral plate and an inner surface of the cylindrical body, the spiral flow channel allows the lower opening and the side-wall opening to communicate with each other,
the magnetic field device includes a permanent magnet body, an inner peripheral side of the permanent magnet body is magnetized to one pole of an N pole and an S pole and an outer peripheral side of the permanent magnet body is magnetized to the other pole, the intensity of magnetization of the permanent magnet body is set to intensity where a magnetic field reaches the inside of the cylindrical body,
in a case in which a magnetic field, which includes lateral magnetic lines of force directed toward a center of the cylindrical body from an outer periphery, is formed or a magnetic field, which includes magnetic lines of force radially directed toward an outer periphery from the center of the cylindrical body, is formed and a current flows in a longitudinal direction in molten metal present in the cylindrical body, the magnetic lines of force and the current cross each other, so that an electromagnetic force caused by Lorentz force is generated, and the molten metal is driven toward the side-wall opening from the lower opening so as to swirl while the molten metal is made to swirl in the spiral flow channel by the electromagnetic force.

A molten metal transfer system of an embodiment of the present invention includes the molten metal transfer pump, a first holding furnace that holds molten metal, and a second holding furnace that holds molten metal, in which the first holding furnace is connected to the suction port of the molten metal transfer pump, and the second holding furnace is connected to the discharge port of the molten metal transfer pump.

DETAILED DESCRIPTION OF THE INVENTION

Figure 1:
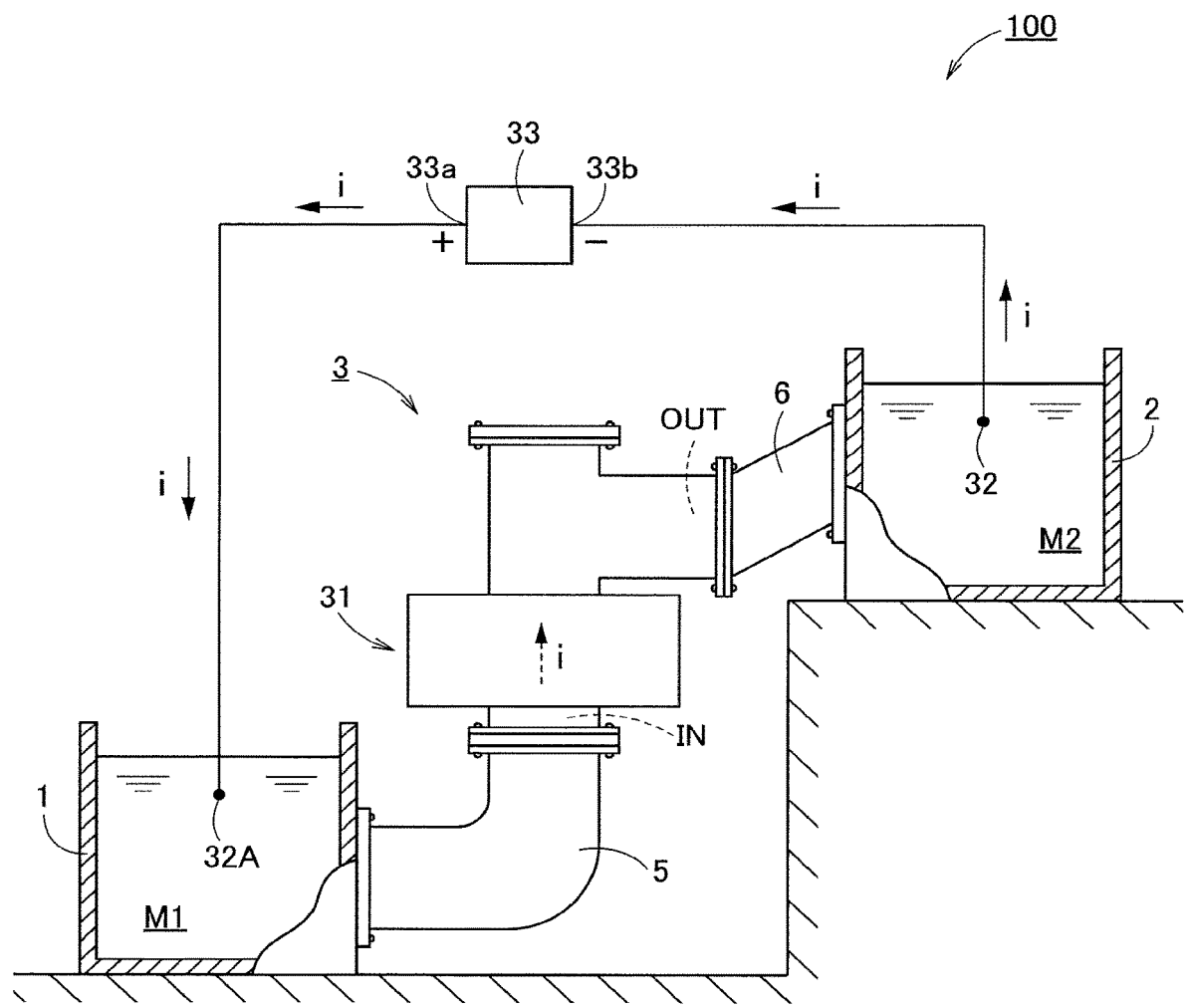
FIG. 1 is a diagram illustrating the entire structure of a molten metal transfer system according to an embodiment of the present invention.

As illustrated in FIG. 1 and the like, embodiments of the present invention are embodied as a pump device 3 that transfers molten conductive metal, and a molten metal transfer system 100 using the pump device 3. The molten conductive metal is molten metal, such as iron, other than non-ferrous metal except for molten non-ferrous metal (for example, Al, Cu, Zn, or Si, an alloy of at least two of them, an Mg alloy, and the like).

As understood from FIG. 1, the pump device 3 is used, for example, to pump molten metal M to an upper holding furnace 2, which is provided on the upper side, from a lower holding furnace 1 that is provided on the lower side.

The principle of the pump device 3 will be briefly descried. The pump device 3 is to transfer and drive molten conductive metal by electromagnetic forces that are caused by Lorentz force generated by a magnetic field generated from a permanent magnet and a current flowing in molten conductive metal. Since the pump device 3 is operated according to this principle (Lorentz force generated by a magnetic field of a permanent magnet and a current flowing through the magnetic field), the operation management of the pump device 3 is much easier than that of a conventional device, the consumption current of the pump device 3 can also be made to be much smaller than that of a conventional electromagnetic pump, and the running costs of the pump device 3 can also be reduced. Further, since the permanent magnet is used, self-heating is also suppressed. Furthermore, since the pump device 3 has a structure in which a mechanically moving portion is not present, the structure of the pump device 3 can be made to be simple and solid against long time use. Moreover, in a case in which a component is worn by high-temperature molten metal M, the worn component can be replaced and can also be easily replaced in the embodiment of the present invention. Accordingly, so-called maintenance associated with use is also very easy.

The embodiments of the present invention will be described in more detail below.

As understood from FIG. 1, the holding furnaces 1 and 2 are connected to both upper and lower ends of the pump device 3. That is, an inlet end (suction port) IN, which is provided at a lower end of the pump device 3, is connected to the holding furnace 1 through an inlet-side connection pipe 5 while communicating with the holding furnace 1, and an outlet end (discharge port) OUT, which is provided at an upper end of the pump device 3, is connected to the holding furnace 2 through an outlet-side connection pipe 6 while communicating with the holding furnace 2. The inlet end IN and the outlet end OUT will be described in detail later, but are connected to each other by one spiral flow channel P formed in a pipe body (casing) 8. The flow channel P is a flow channel that is partitioned by the inner surface of the pipe body 8 and a spiral fin 9b of a spiral body 9 received in the pipe body 8.

In the molten metal transfer system 100 of FIG. 1, to allow a current to flow in a longitudinal direction in the molten metal M present in the flow channel P, a first electrode 32A is provided while being immersed in molten metal M1 present in the holding furnace 1 and a second electrode 32 is provided while being is immersed in molten metal M2 present in the holding furnace 2. These electrodes 32A and 32 are connected to positive and negative terminals 33a and 33b of a power supply 33, respectively. The positions of the first and second electrodes 32A and 32 are not limited thereto, and have only to be set so that electricity is supplied to the molten metal M1 and the molten metal M2.

The power supply 33 may function as at least a DC power supply, but a multifunctional power supply, which functions as a DC power supply and an AC power supply, is used as the power supply 33 in the embodiment of the present invention. That is, the power supply 33 can function as at least a DC power supply and can also switch the polarities of the positive and negative output terminals. Further, the power supply 33 can also function as a low-period or low-frequency (for example, about 0 to 10 Hz, preferably about 0 to 5 Hz) AC power supply. The power supply 33 is adapted so that an output voltage and an output current can also be adjusted. From the point of view of cost, a monofunctional DC power supply can also be used as the power supply 33.

FIG. 1 illustrates a case in which the power supply 33 functions as a DC power supply, and the terminal 33a is used as a positive terminal and the terminal 33b is used as a negative terminal. As described above, the positive terminal 33a is connected to the first electrode 32A and the negative terminal 33b is connected to the second electrode 32. Accordingly, a current i applied from the power supply 33 is output from the terminal 33a returns to the terminal 33b through the molten metal M1 present in the holding furnace 1, molten metal present in the pump device 3, and the molten metal M2 present in the holding furnace 2. In this case, the current i flows in the longitudinal direction to the upper side from the lower side in the molten metal present in the pipe body 8 (flow channel P) illustrated in FIG. 2.

Meanwhile, as understood from the above description, in the power supply 33, the polarity of the terminal 33a can be switched to a negative polarity and the polarity of the terminal 33b can be switched to a positive polarity. In this case, on the contrary to the above-mentioned case, the current i flows to the lower side from the upper side in the molten metal present in the pipe body 8 (flow channel P) illustrated in FIG. 2.

Figure 2:
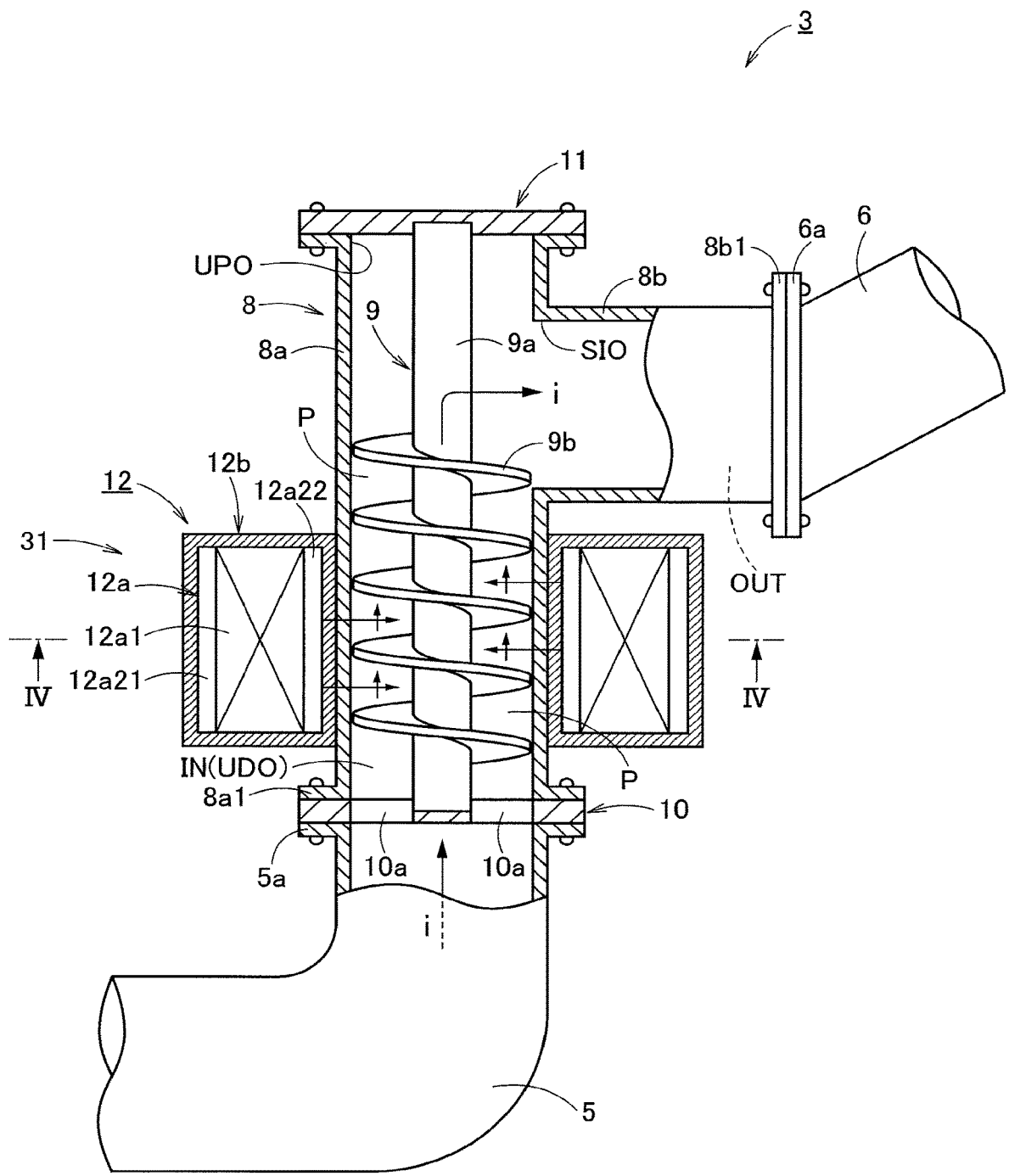
FIG. 2 is a diagram illustrating the longitudinal section of the molten metal transfer pump of FIG. 1.

In addition, in a case in which the power supply 33 functions as a low-period AC power supply, a current i flows so as to alternately vibrate up and down in the molten metal present in the pipe body 8 (flow channel P) illustrated in FIG. 2.

Figure 3:
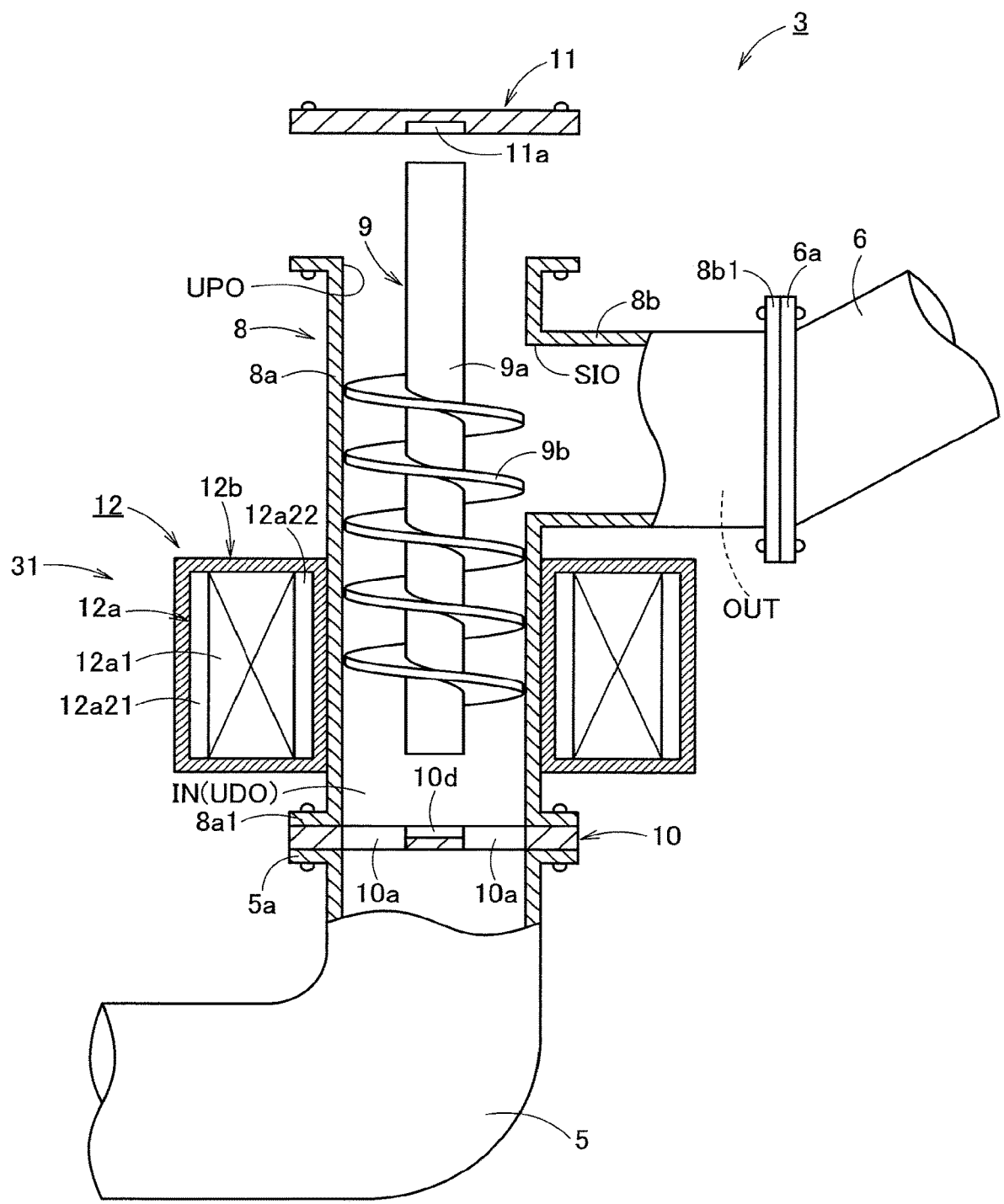
FIG. 3 is a diagram illustrating a separated state in which components of the molten metal transfer pump of FIG. 2 are separated.

The details of the pump device 3 will be described with reference to FIGS. 2 and 3. FIG. 2 is a diagram illustrating the partial longitudinal section of the pump device 3 of which a part is illustrated in a sectional view, and FIG. 3 illustrates a separated state in which components are separated. As understood from FIG. 2, the pump device 3 includes an L-shaped hollow pipe body (casing) 8, a spiral body 9, a spiral body-lower end support plate 10, a lid (spiral body-upper end support plate) 11, and a magnetic field device 12. Each of these members is made of a refractory material. Since chemical components of the refractory material are well-known, the chemical components of the refractory material will not described in detail but general-purpose materials, such as silica (SiO2), zirconia (ZrO2), and silicon carbide, can be employed.

As understood particularly from FIG. 3, the pipe body 8 includes a main vertical inlet pipe portion (cylindrical body) 8a that applies electromagnetic forces F to the molten metal M and an outlet pipe portion 8b that is bent from the inlet pipe portion 8a to the right in FIG. 3. Here, the inlet pipe portion 8a and the outlet pipe portion 8b are made of the same material and are integrated with each other so as to have high strength. The inlet pipe portion (cylindrical body) 8a is formed of a cylindrical side wall, the lower end of the inlet pipe portion 8a is a so-called lower opening UDO (IN), and the upper end of the inlet pipe portion 8a is a so-called upper opening UPO, and the inlet pipe portion 8a includes a side-wall opening SIO on the side wall thereof. Further, since it is possible to very easily attach and detach the spiral body 9 by merely removing the lid 11 of the cylindrical body 8a as described later, the inside of the cylindrical body 8a is also easily cleaned and the spiral body 9 is also easily replaced with a new spiral body 9.

In addition, as described above, the inlet end (lower opening) IN, which is provided at the lower end of the inlet pipe portion 8a, and the inlet-side connection pipe 5 are connected to each other with the spiral body support plate 10 interposed therebetween while communicating with each other. The outlet end (discharge port) OUT, which is provided at the outlet of the outlet pipe portion 8b, is connected to the outlet-side connection pipe 6 while communicating with the outlet-side connection pipe 6.

The spiral body 9 is received in the pipe body 8 (inlet pipe portion 8a) while not being rotated, being detachably attached, and being fixed. That is, when the spiral body 9 is to be received, as understood from FIG. 2, the spiral body 9 is interposed between the lid 11 and the spiral body-lower end support plate 10 in the vertical direction and is supported while being fixed not to be rotated and not to move in the vertical direction. That is, the spiral body 9 is received in the pipe body 8 while being fixed both in the vertical direction and a rotational direction.

Figure 8:
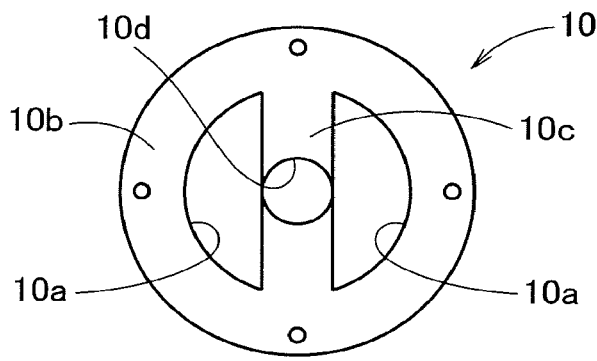
FIG. 8 is a plan view of a spiral body-lower end support plate of FIG. 2.

The plan view of the spiral body-lower end support plate 10 is shown in FIG. 8. As understood from FIG. 8, a plurality of communication openings 10a is formed in a disc, so that the spiral body-lower end support plate 10 is formed to include an annular peripheral portion 10b and a support portion 10c connecting two portions of the inner edge of the peripheral portion 10b facing each other. A plurality of the support portions 10c can also be provided. As understood particularly from FIG. 2, the inlet-side connection pipe 5 and the inlet end IN of the pipe body 8 communicate with each other through the communication openings 10a of the spiral body-lower end support plate 10. As understood from FIG. 8, a support hole 10d, which supports a shaft portion 9a of the spiral body 9 to be described later from above while the shaft portion 9a is fixed, is formed substantially at the center of the surface (inside surface) of the support portion 10c so as to be recessed.

As understood from, for example, FIG. 3, the spiral body 9 includes a columnar shaft portion 9a and a spiral fin (spiral plate) 9b. The fin 9b is disposed on the outer periphery of the shaft portion 9a so as to be wound in the shape of a thread. The spiral body 9 can be formed as an integrated body at first, and can also be formed by attaching the fin 9b to the shaft portion 9a later. In FIG. 3, the fin 9b of the spiral body 9 is formed in the shape of a so-called left-hand thread, but can so be formed in the shape of a right-hand thread. In a case in which the fin 9b is formed in the shape of a right-hand thread, a current i needs to be made to flow in an opposite direction (a direction toward the lower side from the upper side) to drive the molten metal M in the same direction as described above.

Although briefly described above, the spiral flow channel P is partitioned by the outermost peripheral end face of the fin 9b and the inner surface of the inlet pipe portion 8a as understood from FIG. 2. As understood from FIG. 2, the lower end of the flow channel P as an inlet side communicates with the inlet end IN and the upper end of the flow channel P as an outlet side communicates with the outlet end OUT.

A plurality of kinds of bodies having various structures can also be prepared as the spiral body 9. That is, a plurality of kinds of spiral bodies 9 of which the pitches of the fins 9b vary are prepared in advance. A spiral body 9 to be used is determined depending on the specifications, use, and the like of a device. Whenever a spiral body 9 to be used is determined, the spiral body 9 can be replaced and used. In a case in which a spiral body 9 of which the pitch of the fin 9b is small is used, the vertical speed of the molten metal M is reduced. In a case in which a spiral body 9 of which the pitch of the fin 9b is large is used, the vertical speed of the molten metal M is increased.

As illustrated in FIG. 2, the magnetic field device 12 is externally provided so as to surround the outer periphery of the pipe body 8. The magnetic field device 12 is mounted on the pipe body 8 so as to be adjustable in the vertical direction by arbitrary means. Accordingly, a magnetic field generator 31 is moved in the vertical direction so that more efficient drive position of the molten metal M can be selected. Further, the magnetic field generator 31 can also be disposed at a position corresponding to a low temperature where a permanent magnet is less affected by temperature. The preferred position of the magnetic field generator 31 can be estimated in consideration of performance for driving the molten metal M under the same conditions.

As also understood from FIG. 2, the magnetic field device 12 has a structure where a ring-shaped permanent magnet unit 12a is received in a ring-shaped case 12b. Holes for air cooling (air intake ports and exhaust ports) can also be provided at desired positions on the case 12b. Further, as understood particularly from FIG. 4 that is a cross-sectional view of the magnetic field device 12 taken along line IV-IV, the permanent magnet unit 12a includes a ring-shaped permanent magnet body 12a1 and ring-shaped yokes 12a21 and 12a22 that surround the inner peripheral surface and the outer peripheral surface of the ring-shaped permanent magnet body 12a1 and are made of a ferromagnetic material. As understood from FIG. 4, the permanent magnet body 12a1 is formed in a so-called ring shape, the inner peripheral side of the permanent magnet body 12a1 is magnetized to an N pole, and the outer peripheral side of the permanent magnet body 12a1 is magnetized to an S pole. On the contrary, the direction of magnetization may be set as illustrated in FIG. 5 so that the inner peripheral side of the permanent magnet body 12a1 is magnetized to an S pole and the outer peripheral side of the permanent magnet body 12a1 is magnetized to an N pole. In a case in which the inner peripheral side of the permanent magnet body 12a1 is magnetized to an S pole and the outer peripheral side of the permanent magnet body 12a1 is magnetized to an N pole, the direction of a current i may be changed to pump the molten metal M in the flow channel P.

Figure 4:
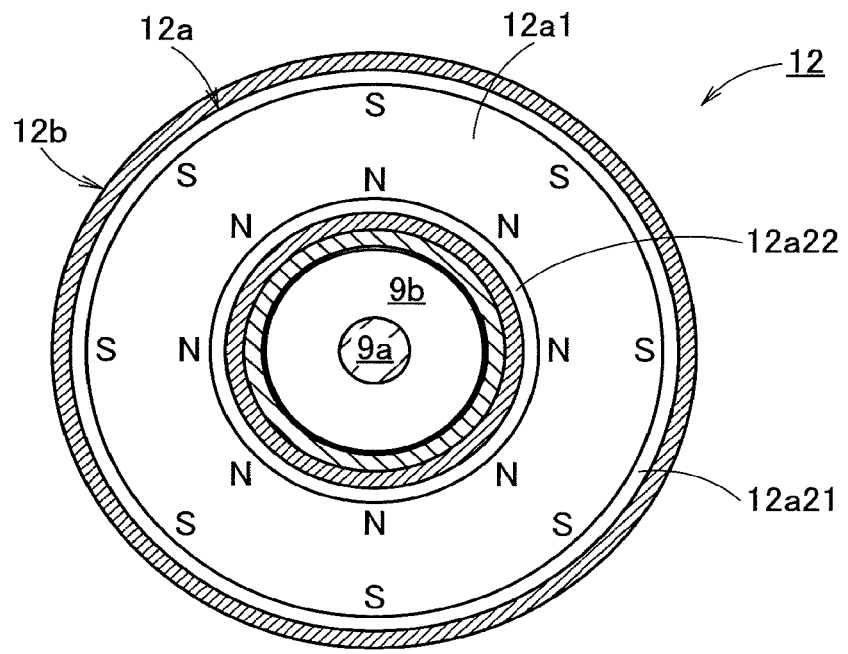
FIG. 4 is a cross-sectional view taken along line IV-IV of FIG. 2.
Figure 5:
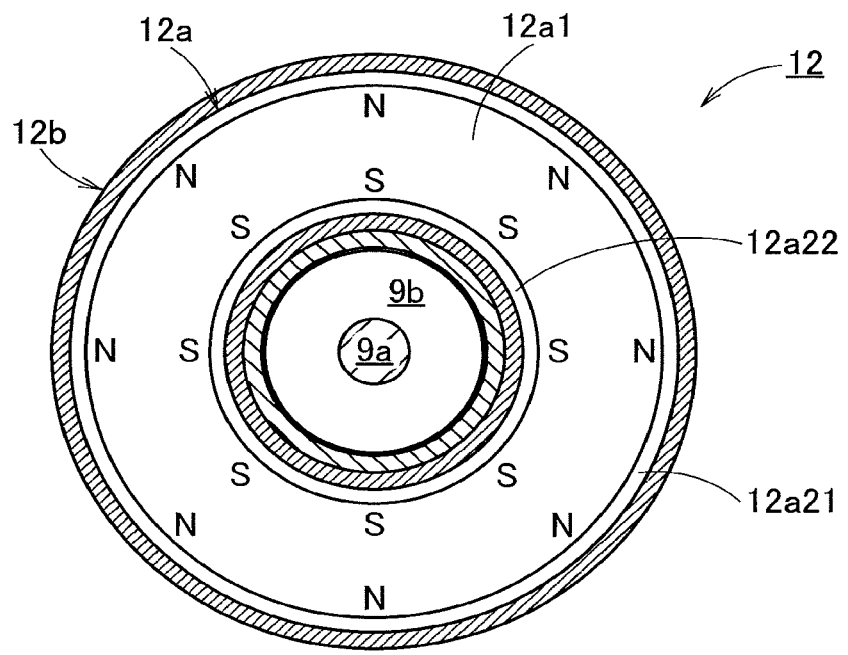
FIG. 5 is a cross-sectional view of a modification corresponding to FIG. 4.
Figure 6:
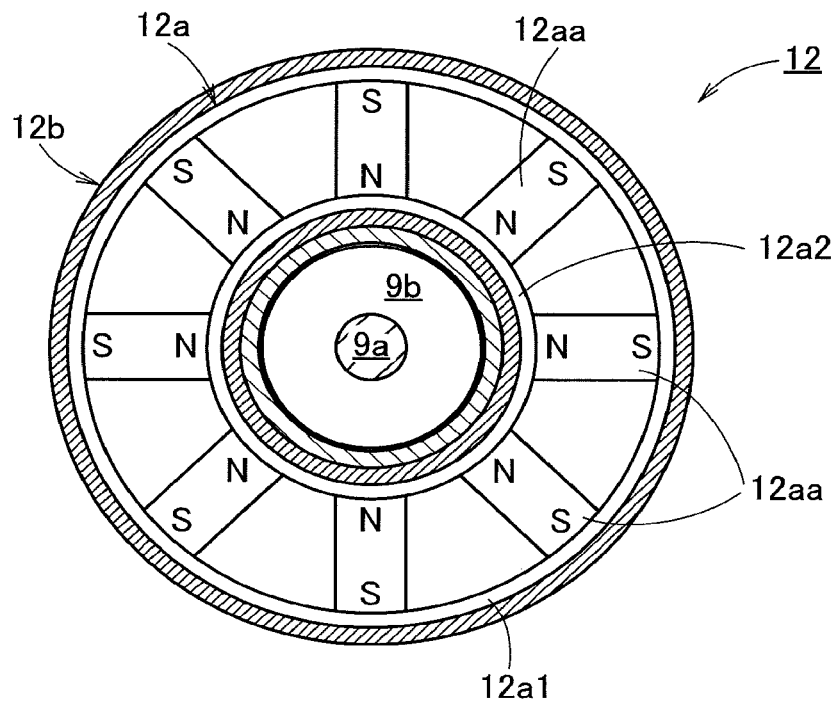
FIG. 6 is a cross-sectional view of another modification corresponding to FIG. 4.
Figure 7:
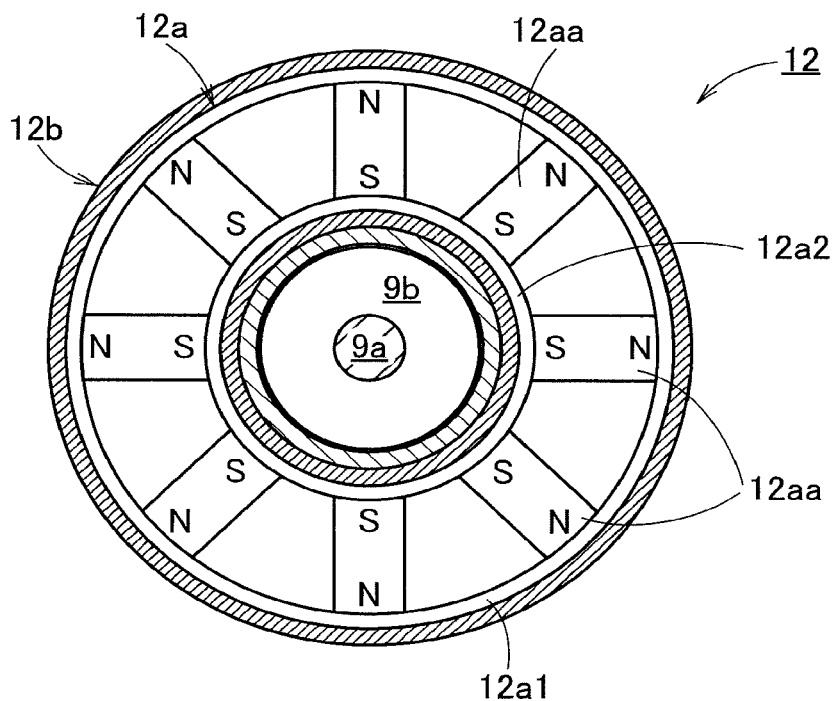
FIG. 7 is a cross-sectional view of a modification corresponding to FIG. 5.

Further, the permanent magnet unit 12a is formed as a ring-shaped integrated body in FIGS. 4 and 5, but can also be formed so as to include a plurality of permanent magnet pieces 12aa as understood from FIGS. 6 and 7. Even in this case, the yokes 12a21 and 12a22 function as ferromagnetic yokes that magnetically connect the plurality of permanent magnet pieces 12aa.

For example, the pump device 3 and the molten metal transfer system 100 having been described above can be assembled in the following manners. However, various assembly orders other than assembly orders to be described below can be employed according to situations in the site or the like.

That is, as understood particularly from FIG. 3, a flange portion 8a1 of the lower end of the inlet pipe portion 8a of the pipe body 8 and a flange portion 5a of the inlet-side connection pipe 5 are connected to each other with the spiral body support plate 10 interposed therebetween while the inlet pipe portion 8a and the inlet-side connection pipe 5 communicate with each other, and a flange portion 8b1 of an end of the outlet pipe portion 8b of the pipe body 8 and a flange portion 6a of the outlet-side connection pipe 6 are connected to each other while the outlet pipe portion 8b and the outlet-side connection pipe 6 communicate with each other.

The magnetic field generator 31 is externally mounted on the inlet pipe portion 8a in an arbitrary order. After that, the spiral body 9 is inserted into the inlet pipe portion 8a from the upper side (upper opening UPO), and the lower end of the spiral body 9 is supported by the spiral body-lower end support plate 10. Then, the lid 11 is mounted on the inlet pipe portion 8a. As understood particularly from FIG. 3, a support hole 11a, which receives the top portion of the shaft portion 9a of the spiral body 9 while the top portion of the shaft portion 9a is fixed, is formed on the inner surface of the lid 11 so as to be recessed. Accordingly, the spiral body 9 is supported by the lid 11 and the spiral body support plate 10 while being fixed.

Meanwhile, disassembly can be performed in the reverse order of the above-mentioned assembly order. The spiral body 9 can be replaced with a new one of which the kind is the same as the kind of the spiral body 9 or a new one of which the kind is different from the kind of the spiral body 9 through the disassembly as necessary. In a case in which the spiral body 9 is replaced with a new one of which the kind is different from the kind of the spiral body 9, the rising speed of the molten metal M can be changed to a required speed. However, since the disassembly can be performed through only the removal of the lid 11, so-called maintenance can be very easily performed. Moreover, the replacement of the pump device 3 itself can also be performed through the separation of the pump device 3 from the inlet-side connection pipe 5 and the outlet-side connection pipe 6. Naturally, the replacement of the spiral body-lower end support plate 10 can also be performed.

Next, the drive of the molten metal M performed by the pump device 3 according to the embodiment of the present invention will be described.

Figure 9:
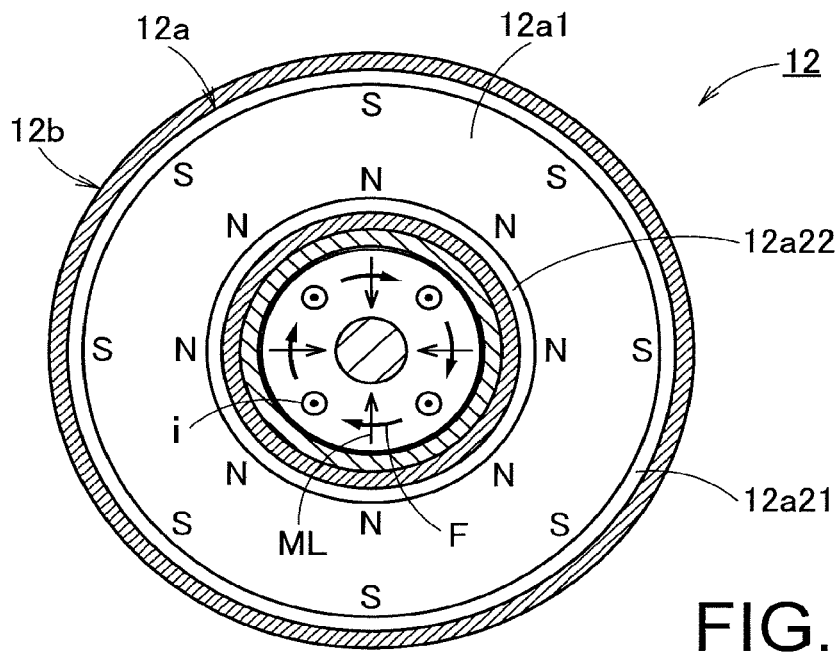
FIG. 9 is a diagram illustrating electromagnetic forces of the molten metal transfer pump that is caused by Lorentz force.
Figure 10:
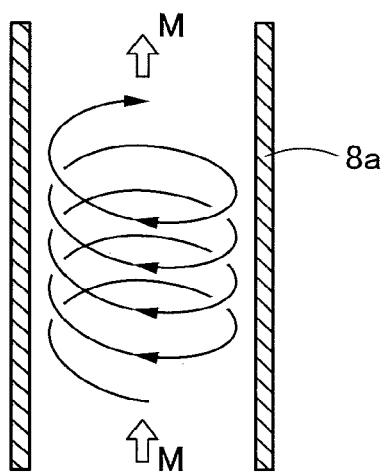
FIG. 10 is a diagram illustrating an operation of FIG. 9.

As understood particularly from FIG. 2, a current i applied from the power supply 33 of FIG. 1 flows in the longitudinal direction to the upper side from the lower side in the molten metal present in the inlet pipe portion 8a (flow channel P). As understood particularly from FIG. 9, magnetic lines ML of force generated from the magnetic field device 12 are directed toward the center from the outer periphery of the magnetic field device 12. The current i and the magnetic lines ML of force cross each other, so that electromagnetic forces F caused by Lorentz force are generated. The electromagnetic forces F are generated over the entire circumference as clockwise electromagnetic forces in FIG. 9. Accordingly, the electromagnetic forces F are composed, so that molten metal is rotated clockwise in FIG. 9 by a resultant force RF of the electromagnetic forces F. That is, molten metal swirls clockwise in the flow channel P. Therefore, the molten metal rises while swirling so as to ascend a so-called spiral staircase along an upward gradient of the fin 9b of the spiral body 9 as understood from FIG. 2. The principle of an aspect in which the molten metal rises while swirling is illustrated in FIG. 10. Then, the molten metal reaches the outlet pipe portion 8b from the upper end side of the inlet pipe portion 8a and flows into a furnace body 2 through the outlet-side connection pipe 6. In this case, it is possible to adjust capability for driving the molten metal M, that is, the amount of molten metal to be transferred per unit time by changing the intensity of the current i. Power consumption in this case is much lower than the power consumption of an electromagnet of the conventional device.

Meanwhile, in a case in which the magnetic field device illustrated in FIG. 5 is used as the magnetic field device 12, the current from flowing from the power supply 33 needs to be made to flow in an opposite direction.

Further, in a case in which a low-period alternating current is made to flow from the power supply 33 in the system of FIG. 1, the swirl direction of the molten metal is switched to the left and right in a short period in the pump device 3 (inlet pipe portion 8a). As a result, vibration is applied to the molten metal. Impurities contained in the molten metal are removed by the vibration, so that the quality of the molten metal is improved. That is, a method of pumping molten metal to the upper furnace body 2 after improving the quality of the molten metal can also be used. Various other methods can be used. For example, after the molten metal present in the upper furnace body 2 is introduced into the pump device 3 and the quality of the molten metal is improved, the molten metal may be made to return to the furnace body 2 again.

Figure 11:
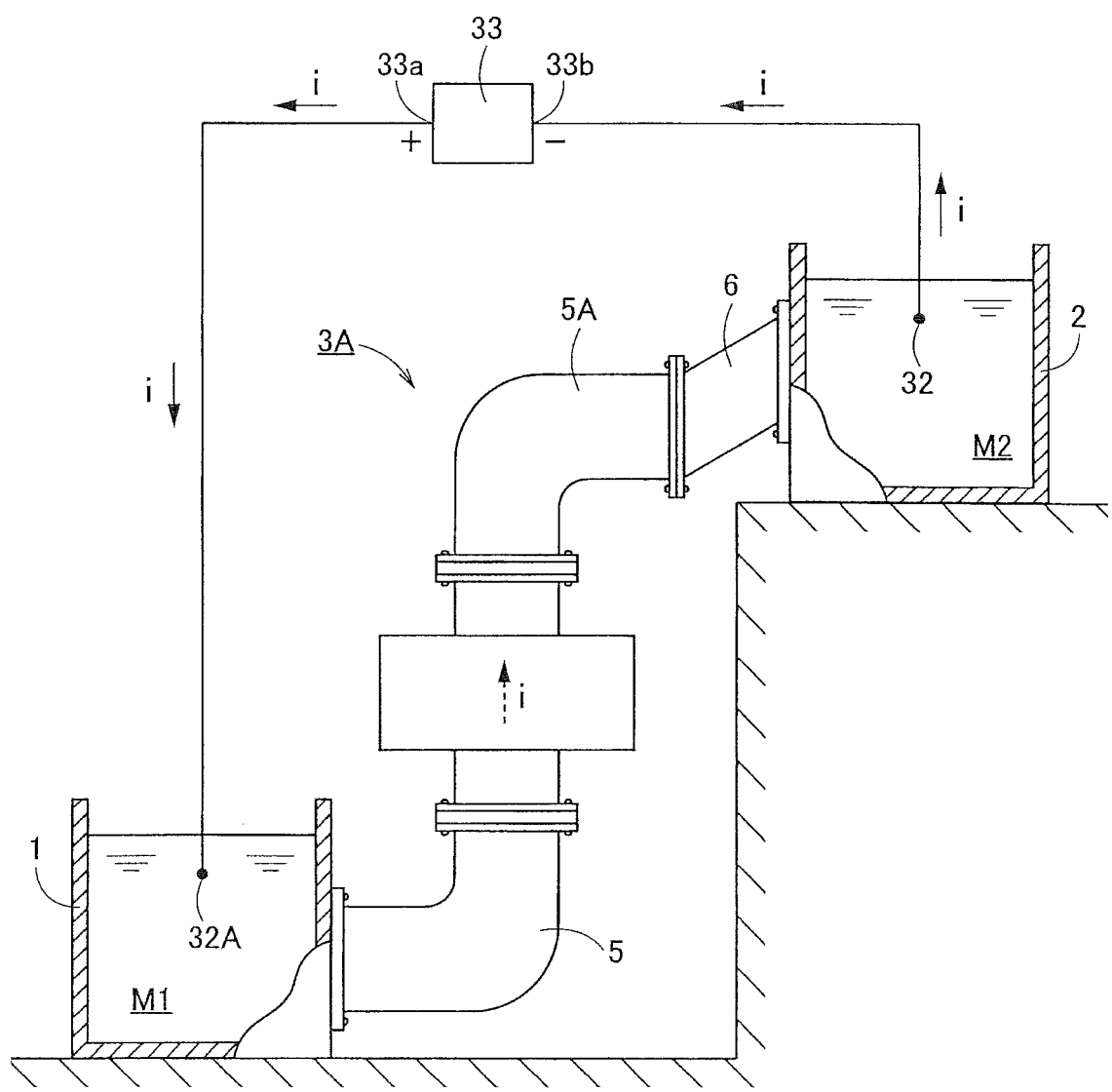
FIG. 11 is a diagram illustrating the entire structure of a molten metal transfer system according to another embodiment.
Figure 12:
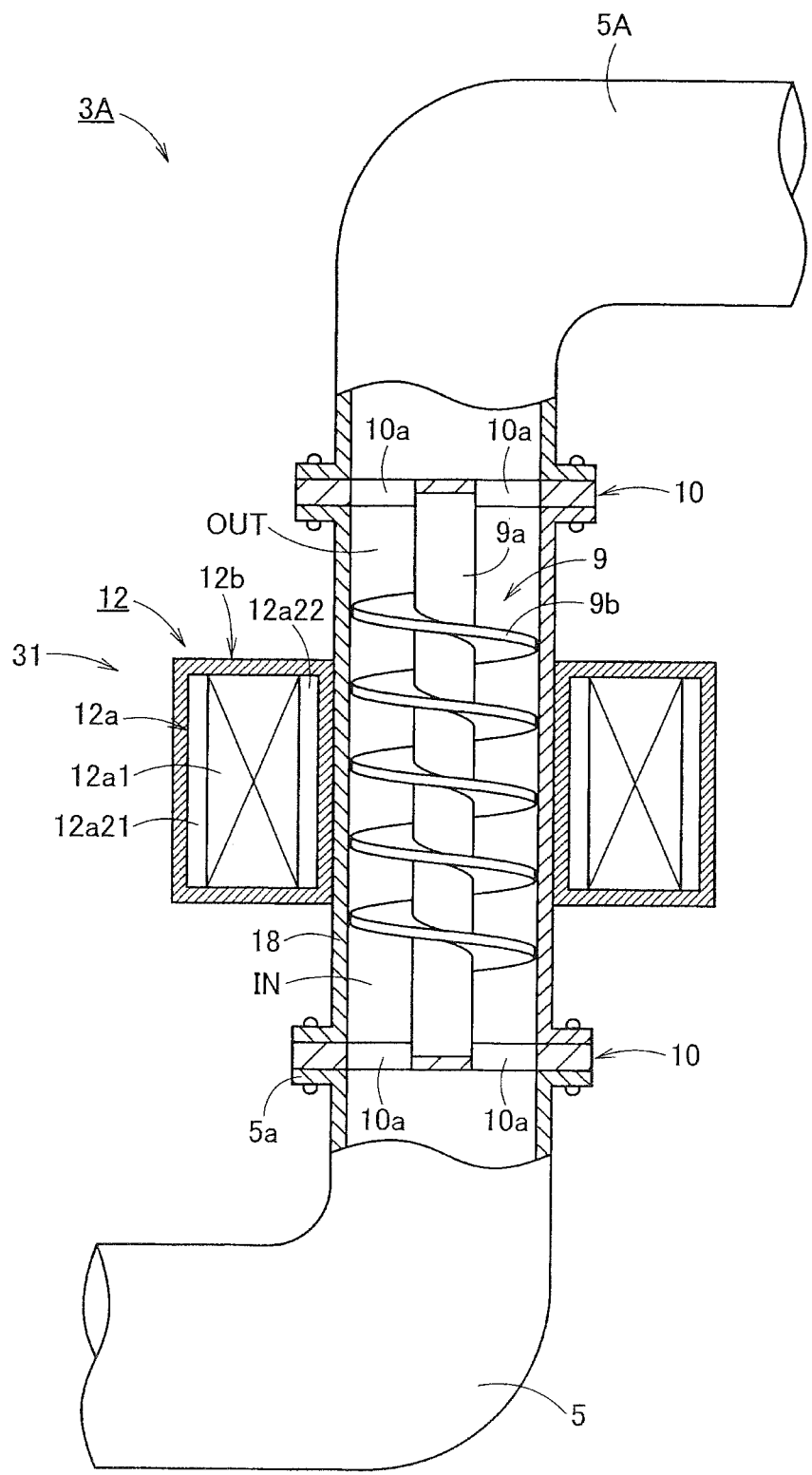
FIG. 12 is a diagram illustrating the longitudinal section of a molten metal transfer pump of FIG. 11.

FIGS. 11 and 12 illustrate another example of the embodiment of the present invention. In this example, a pump device having another structure is used as a pump device 3A. That is, the casing 8 has been formed in the shape of an L-shaped pipe in the above-mentioned embodiment, but the embodiment of FIGS. 11 and 12 has a structure in which a casing 18 is formed in the shape of a straight pipe so as to be easily manufactured. Accordingly, the upper end portion of the casing 18 is connected to the outlet-side connection pipe 6 as the same structure as the lower end portion of the casing 18. That is, the spiral body support plate 10 of FIG. 8 is used while being interposed between the casing 18 and the outlet-side connection pipe 6 so that the support hole 10d faces the lower side. Since other structures are substantially the same as the above-mentioned structures, the detailed description thereof will be omitted. Even in this embodiment, the spiral body 9, the spiral body support plate 10, and the like can be replaced. Meanwhile, reference numeral 5A in FIGS. 11 and 12 denotes the same connection pipe as the inlet-side connection pipe 5.

The pipe body 8 (inlet pipe portion 8a) has stood vertically in the above-mentioned embodiments, but does not necessarily stand vertically and can be installed so as to be inclined.

The invention claimed is:
1. A molten metal transfer pump that sucks and discharges molten conductive metal, the molten metal transfer pump comprising:
    a cylindrical body that is formed of a cylindrical side wall and includes a lower opening as a suction port provided at a lower end and an upper opening provided at an upper end;
    a spiral body that is received in the cylindrical body while being fixed; and
    a magnetic field device that is provided on an outer periphery of the cylindrical body, wherein the cylindrical body includes a side-wall opening that is opened on the side wall and serves as a discharge opening, the spiral body includes a spiral plate, an inner space of the cylindrical body is partitioned into one spiral flow channel, which extends in a spiral shape, by an outer peripheral edge of the spiral plate and an inner surface of the cylindrical body, the spiral flow channel allows the lower opening and the side-wall opening to fluidly communicate with each other, the magnetic field device includes a permanent magnet body, an inner peripheral side of the permanent magnet body is magnetized to one pole of an N pole and an S pole and an outer peripheral side of the permanent magnet body is magnetized to the other pole of an N pole and an S pole, the intensity of magnetization of the permanent magnet body is set to intensity where a magnetic field reaches an inside of the cylindrical body, in a case in which the magnetic field, which includes lateral magnetic lines of force directed toward a center of the cylindrical body from an outer periphery, is formed or the magnetic field, which includes magnetic lines of force radially directed toward an outer periphery from the center of the cylindrical body, is formed and a current flows in a longitudinal direction in molten metal present in the cylindrical body, the magnetic lines of force and the current cross each other, so that an electromagnetic force caused by Lorentz force is generated, and the molten metal is driven toward the side-wall opening from the lower opening and caused to swirl in the spiral flow channel by the electromagnetic force.

2. The molten metal transfer pump according to claim 1, wherein the spiral body includes a shaft portion on which the spiral plate is mounted, the shaft portion is supported between the lower opening and the upper opening while being fixed, and the spiral body is received in the cylindrical body from the upper opening so as to be detachably attached to the cylindrical body.

3. The molten metal transfer pump according to claim 1, wherein the permanent magnet body is formed of one ring-shaped permanent magnet.

4. The molten metal transfer pump according to claim 1, wherein the permanent magnet body includes a plurality of permanent magnet pieces and these permanent magnet pieces are arranged circumferentially.

5. The molten metal transfer pump according to claim 1, wherein the spiral plate of the spiral body is formed in the shape of a right-hand thread or a left-hand thread.

6. The molten metal transfer pump according to claim 1, comprising: a spiral body-lower end support plate that is mounted on the lower opening of the cylindrical body, wherein the spiral body-lower end support plate supports a lower end of the spiral body and includes a communication opening that allows the inside of the cylindrical body to communicate with an outside of the cylindrical body.

7. The molten metal transfer pump according to claim 1, comprising: a first electrode and a second electrode that allow a current to flow in the longitudinal direction in the molten metal present in the cylindrical body.

8. The molten metal transfer pump according to claim 7, comprising:
a power supply to which the first electrode and the second electrode are connected.

9. The molten metal transfer pump according to claim 8, wherein the power supply is a DC power supply.

10. The molten metal transfer pump according to claim 8, wherein the power supply is an AC power supply.

11. The molten metal transfer pump according to claim 1, further comprising: a lid that is mounted on the upper opening of the cylindrical body, wherein the spiral body is supported and fixed by the lid and the spiral body-lower end support plate.

12. The molten metal transfer pump according to claim 1, wherein the plurality of permanent magnet pieces are magnetically connected to each other by yokes.

13. A molten metal transfer system comprising: the molten metal transfer pump according to claim 1; a first holding furnace that holds molten metal; and a second holding furnace that holds molten metal, wherein the first holding furnace is indirectly connected to a lower opening of the molten metal transfer pump, and the second holding furnace is indirectly connected to a side-wall opening of the molten metal transfer pump.

14. The molten metal transfer system according to claim 13, wherein the first electrode is provided at a position where the first electrode is capable of supplying electricity to the molten metal received in the first holding furnace, and the second electrode is provided at a position where the second electrode is capable of supplying electricity to the molten metal received in the second holding furnace.

* * * * *